US005560713A

United States Patent [19]

Christenson

[11] Patent Number: 5,560,713

[45] Date of Patent: Oct. 1, 1996

[54] EJECTOR WEAR SHOE

[75] Inventor: Ronald E. Christenson, Parsons, Tenn.

[73] Assignee: McNeilus Truck and Manufacturing, Inc., Dodge Center, Minn.

[21] Appl. No.: 377,147

[22] Filed: Jan. 24, 1995

[51] Int. Cl.[6] ................................ F16C 29/02; B60P 1/32

[52] U.S. Cl. ................................ 384/42; 384/41; 414/513

[58] Field of Search .................................. 384/7, 26, 41, 384/42; 414/513

[56] References Cited

U.S. PATENT DOCUMENTS

| | | | |
|---|---|---|---|
| 1,981,992 | 11/1934 | Curtis | 384/41 |
| 2,888,300 | 5/1959 | Curtis et al. | 384/42 |
| 3,053,580 | 9/1962 | Bullard, III et al. | 384/41 |
| 3,486,646 | 12/1969 | O'Brien et al. | 414/513 |
| 4,565,125 | 1/1986 | Khan | 384/42 X |
| 5,192,189 | 3/1993 | Murata et al. | 384/42 X |

*Primary Examiner*—Thomas R. Hannon
*Attorney, Agent, or Firm*—Haugen and Nikolai, P.A.

[57] ABSTRACT

A replaceable wear shoe is used with a refuse truck ejector mechanism supported by load bearing slide bars which slide along spaced parallel rails. The wear shoe body is C-section shape with an outer surface configured to preferentially ride the rail of the refuse truck and support the ejector mechanism. The inner surface of the wear shoe body forms a channel for receiving a recessed portion of the slide bar. The wear shoe body covers the portion of the slide bar which contacts the rail. Retaining means in the form of plates are used to secure the wear shoe body to the slide bars.

12 Claims, 1 Drawing Sheet

EJECTOR WEAR SHOE

BACKGROUND OF THE INVENTION

I. Field of the Invention

The present invention is directed primarily to truck bodies designed specifically for refuse hauling trucks and, more particularly, to a replaceable wear shoe for use on the ejection or packing mechanisms on such vehicles.

II. Description of the Related Art

Refuse pickup trucks commonly include a truck body specifically designed for receiving, compacting, hauling and discharging refuse materials which includes all the associated operating mechanisms. Ejector or packer Systems are used on such truck bodies in the compacting of the refuse within the truck body and the subsequent discharge of the refuse from the truck body. Two successful ejector systems used in refuse hauling are known as front loaders or rear loaders.

Front loaders include a refuse hauling reservoir designed for loading from the front of the vehicle and discharging from the rear of the vehicle. A cylinder operated ejection mechanism moves a wall aft on a horizontal plane in the manner of a plow to pack the contents of the refuse in the refuse reservoir and then moves the wall forward to allow more refuse to enter the reservoir. Once the refuse reservoir is full it must be emptied. A container discharge closure mechanism located at the rear of the body is opened and the ejector cylinder is fully extended to move the wall fully aft in the truck body to a position where the refuse will be completely expelled.

The rear loader includes a refuse hauling reservoir designed for loading and discharging from the rear of the vehicle. This system includes a hydraulic compacting mechanism which repeatedly compacts the refuse in a forward direction after each loading. In this manner, refuse eventually fills the available reservoir extending from the front end back towards the rear of the body until no more material can be compacted.

The ejector wall against which the refuse is compacted is a part of a cylinder operated ejection mechanism which, in effect, moves the wall forward and aft, on a horizontal plane, in the manner of a plow. The refuse is packed against the ejector which resists the packing of the refuse; the ejector is fully forward when the base calibrating body is fully packed. The ejector can then be operated rearward to expel the entire contents of the refuse volume during ejection. Typically, the bottom portion of the ejection mechanism is supported on a plurality of load bearing sliders along which the ejection mechanism slides. These load bearing sliders are adapted to support the ejector system just above the truck body floor.

An hydraulic cylinder mounted behind the cab on the truck chassis is designed to be connected between the truck chassis and the ejector and to operate and move the ejector system fore and aft in the refuse collecting body. The cylinder operates to position the ejector system as desired. When the cylinder is fully retracted, the ejector wall is in the fully forward position, the position assumed when the truck is fully loaded with refuse. When the cylinder is fully extended, the ejector wall is moved fully aft in the truck body to a position where the refuse will be completely expelled.

Both the rear loader and the front loading refuse trucks typically employ load bearing sliders that reciprocally ride on rails and are adapted to slidably support the ejector system just above the truck body floor. It will be appreciated that the sliders undergo a tremendous amount of wear because of the repeated packing of refuse within the container. The load bearing slide system consists of spaced parallel rails located along the length of the refuse receptacle. Load bearing sliders attached to the ejector mechanism ride in recesses configured in the rails. It has been found that the forward and aft portions of the load bearing sliders wear relatively rapidly, more rapidly than the remaining portion of the ejector mechanism. It is expensive and undesirable to require replacement of an entire ejector system because of the rapid wear of a portion of the sliders. Replaceable wear shoes applicable to the areas of relatively high wear experienced by the side rails would greatly enhance ejector life.

Therefore the primary object of the invention to provide a replaceable wear shoe that directly mounts to a slide bar of an ejector system so that the wear shoe is positioned to slide along the track for preferentially bearing the force and becoming worn instead of the slide bar thereby increasing the life of the ejector system.

Another object of the present invention is to provide a wear shoe for placement at the areas receiving the most force and resultant wear during the operation of the ejector mechanism.

Still another object of the present invention is to provide a slip-on wear shoe which is easily replaceable.

Yet another object of the present invention is to provide a wear shoe which is easily manufactured at a cost significantly less than the cost of replacing the entire ejector system.

A further object of the invention is to provide a wear shoe for placement along the entire length of an ejector system slide bar.

SUMMARY OF THE INVENTION

By means of the present invention, the slide bar wear associated with the prior ejector designs for refuse compactors is greatly reduced or substantially eliminated by the provision of a replaceable wear shoe placed on the fore and aft portions of the ejector system slide bars. The fore and aft portions are the areas associated with the rapid excessive wear of the slide bars. The use of replaceable wear shoes increases the life of the ejector systems since the entire ejector system will not have to be replaced because of the rapid excessive wear of the slide bars. The wear shoes of the present invention will bear the force in place of the slide bars and thus, only the wear shoes will need to be replaced once they become worn.

The wear shoe of the present invention has a generally rectangular C-section or channel shape and fits over the portion of the slide bar which slides along the interior of the track of the ejector system. The wear shoe is in the form of a channel shape received on the slide bar. The slide bar portion which receives the wear shoe is recessed with respect to the rest of the slide bar so that when the wear shoe is placed on the slide bar it is substantially coplanar with the rest of the slide bar. The edges of the wear shoe exterior which rides along the interior of the track are chamfered for easier fit within the track, smoother interface between the wear shoe and track surface and for receiving the retaining means.

The wear shoe is secured to the slide bar by an end plate and a beveled plate. The end plate has a flat planar surface with a transverse lip extending from one edge so that the lip overlaps one beveled edge of the wear shoe. This prevents the wear shoe from sliding off the end of the slide bar. The end plate is secured to the end of the slide bar by three screws. The beveled plate overlaps the beveled edge portion of the wear shoe opposite the end overlapped by the end plate. This plate, welded to the slide bar at the end opposite the end portion, slips over another beveled edge to retain the wear shoe on the slide bar. The beveled configuration of the plate results in a smoother interface between the wear shoe, the beveled plate and the track along which the wear shoe slides.

For a better understanding of the above and other features and advantages, reference is made to the following and detailed description of an illustrative embodiment reflected in the accompanying drawings in which like numerals in the several views refer to corresponding parts.

DETAILED DESCRIPTION

Figure 1:
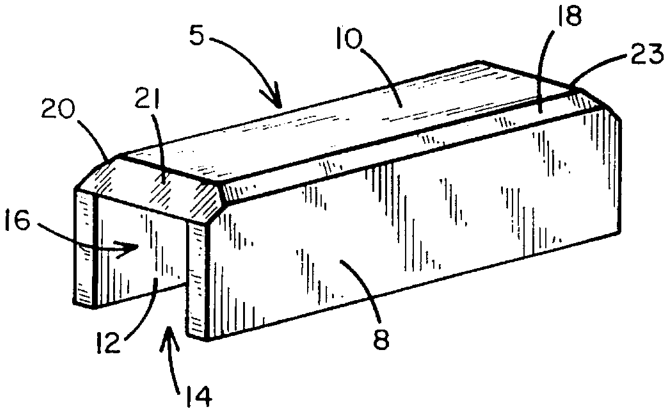
FIG. 1 is a side perspective view of the wear shoe of the present invention.

The present invention is a wear shoe for use on an ejector system for refuse hauling trucks. The wear shoe 5, shown in FIG. 1, has a generally rectangular configuration with parallel walls 8 and 12 connected by wall 10 to form a C-section. The open length 14 forms a channel 16 which runs the length of the wear shoe 5. This channel 16 will receive the slide bar 22 as will be explained. The wear shoe 5 is chamfered along the length of the corner 18 between wall 8 and wall 10 and along the length of the corner 20 between wall 12 and wall 10 as shown in FIG. 1. Wall 10 also has chamfered end edges 21 and 23.

The wear shoe 5 can be made of a variety of materials, preferably composite materials, such as urethanes and nylons, because of the ease of manufacture. However, abrasion resistant metal, particularly steel, materials are also well suited compositions of materials of construction for the wear shoe. Thus, any easily formed abrasion resistant material of suitable strength may be employed.

Figure 3:
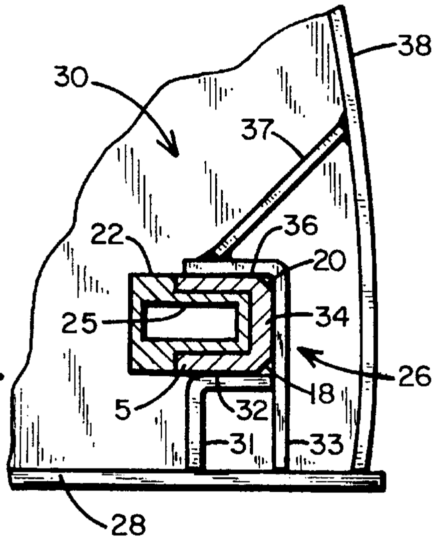
FIG. 3 is a cross-section view showing the wear shoe of the invention mounted on a slide bar within the track of the refuse receptacle.
Figure 4:
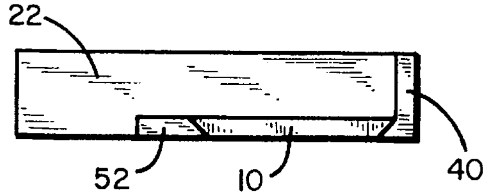
FIG. 4 is a top view of the wear shoe of the invention mounted in recess in a slide bar.
Figure 2:
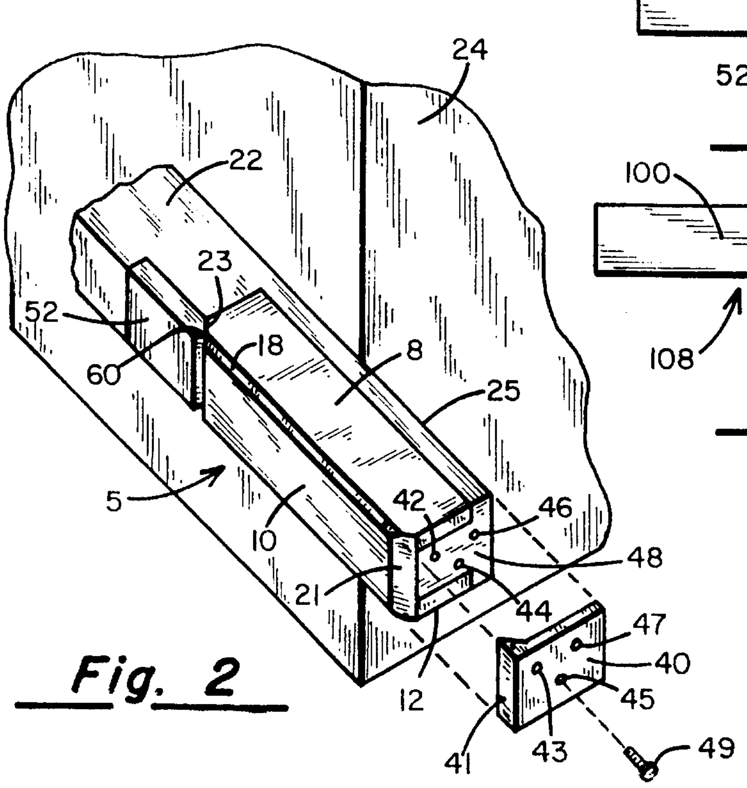
FIG. 2 is a exploded perspective of the wear shoe placed on the slide bar of the ejector system.

The channel 16 should conform suitably to the slide bar 22 so the wear shoes can be placed over the slide bar 22 of the ejector system as shown in FIG. 2. The slide bar 22 extends from the ejector system wall 24 which compresses, compacts and ejects the refuse located in the refuse receptacle. The track 26 is shown in FIG. 3 located just above the floor 28 of the refuse receptacle 30. The track 26 is formed from a first angle member 31 which extends from the truck floor 28 to form the lower surface 32 of the track 26. A second angle member 33 extends from the floor 28 to form the side 34 and top 36 surfaces of the track 26. A reinforcing support member 37 extends between the side wall 38 of the refuse receptacle 30 and the top 36 of the track 26. The wear shoes 5 fit over the fore and aft portions of the slide bar 22 which slides along the track 26.

As shown in FIGS. 2 and 3, the portion of the slide bar 25 over which the wear shoe 5 fits is sized smaller than the remaining portion of the slide bar 22. When the wear shoe is secured to the slide bar portion 25, the wear shoe 5 and slide portion 25 are substantially coplanar with the rest of the slide bar 22 thus forming a smooth interface between the slide bar 22, wear shoe 5 and track 26. This allows the ejector wall 24 to operate smoothly as it is moved along the track 5.

The wear shoe 5 is secured to the fore and aft areas of the slide bar 22 by means of two plates. The first plate, end plate 40, has a generally rectangular shape with a beveled member 41 extending transversely from the end plate 40. The end plate 40 mounts by screws, one of which is shown as 49, through plate holes 43, 45, and 47 into threaded holes 42, 44 and 46 located on the end 48 of slide bar 22. Plate 40 secures one end of the wear shoe 5 in place by overlapping end 48 to prevent it from sliding longitudinally off the slide bar 22. Lateral displacement is prevented by beveled member 41 which overlaps the chamfered edge 21. The second plate is the beveled plate 52. Beveled plate 52 is welded to the slide bar 22 so that the beveled edge 60 extends over the smaller portion 25 of the slide bar 22. When the wear shoe 5 is located in position on the slide bar 22, beveled edge 60 overlaps a correspondingly beveled edge 23 of wear shoe 5. The end plate 40 and beveled plate 52 can be made out of steel or any other suitable material. Furthermore, an alternative to the beveled plate 52 is to extend a portion of slide rail 22 over the smaller slide rail portion 25 to form a beveled edge for overlapping and retaining the end of the wear shoe in position.

Wear shoes 5 are positioned on the fore and aft portions of the slide bar 22 so as the ejector wall 24 moves back and forth within the refuse receptacle, the wear shoes 5 slide along with the slide bar 22 in the track 26 and bears the wear instead of the fore and aft portions of the slide bars 22. Since the portion of the slide bar 22 containing the wear shoe 5 is coplanar with the remaining portion of the slide bar 22, the ejector wall 24 moves smoothly as the wear shoe 5 and slide bars move along the track 26. The wear shoe 5 is preferably configured to be placed on either the fore or aft portion of the slide bar 22 thus making it interchangeable.

Figure 5:
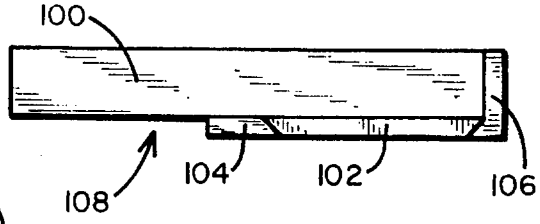
FIG. 5 a top view of an alternative embodiment of the slide rail with the wear shoe mounted on a slide bar without recesses.

An alternative embodiment is shown in FIG. 5 in which the slide bar 100 is simply a piece of bar stock of constant cross-section. The rear shoe configuration 102 is the same, except that the wear shoe along with beveled plate retainer 104 and end plate 106 fit over the slide bar 100. In this embodiment, the entire ejector system rides on the protruding replaceable wear shoes. Such a design affords a simplified construction in which the member 100 needs no special processing. This embodiment requires that the length of each shoe 102 including the retainer 104 and end plate 106 be sufficient such that the shoe remains within the track during full reciprocal motion of the ejector.

While the above provides a full and complete disclosure of the preferred embodiment of the present invention, various modifications, alternate constructions, and equivalence will occur to those skilled in the art given the benefit of this disclosure, thus, the invention is not limited to the specific embodiment described herein, but is defined by the appended claims.

What is claimed is:

1. A wear shoe for use with an ejector mechanism supported by load bearing slide bars which slide along spaced apart parallel ejector rails, said wear shoe comprising:

(a) a replaceable wear shoe body having a generally C-section shape with first and second ends and with an outer surface substantially coplanar with a slide bar and configured to provide a wear surface that contacts the ejector rails of a refuse truck in an area of high wear and supports the ejector mechanism to be reciprocated along said rails and an inner surface forming a channel for receiving said slide bar whereby said wear shoe body covers a portion of said slide bar contacting said rail; and (b) retaining means for securing said wear shoe body to said slide bar.

2. The wear shoe of claim 1 wherein said retaining means includes removable retaining means for contacting and overlapping a first mating surface on a first end of said wear shoe body.

3. The wear shoe of claim 2 wherein said retaining means further includes a permanent retaining means for contacting and overlapping a second mating surface on a second end of said wear shoe body.

4. The wear shoe of claim 3 wherein said first and second mating surfaces are beveled edges.

5. The wear shoe device of claim 4 wherein said wear shoe body is made of a composite material.

6. The wear shoe device of claim 1 wherein said wear shoe body is made of a composite material.

7. A wear shoe system for use in the ejection mechanism supported by two spaced load bearing elongated slide bars, having first and second end sections, which slide on spaced slide rails of a track assembly, said wear shoe system comprising:

(a) four replaceable C-section wear shoe bodies, each said wear shoe body having an outer surface configured to ride on a slide rail of a refuse truck and support said ejector mechanism and an inner surface forming a channel for receiving said slide bar;

(b) a first retaining means removably secured to an end of each said slide bar for retaining said wear shoe body on said slide bar;

(c) a second retaining means for retaining said wear shoe body on said slide bar; and (d) wherein a first one of said four replaceable wear shoe bodies covers a first end section of a first slide bar, a second one of said four repleaceable wear shoes covers a second end section of said first slide bar, a third of one of said four replaceable wear shoes covers a first end section of a second slide bar and a fourth one of said four replaceable wear shoes covers a second end section of said second slide bar and wherein each said slide bar is recessed at said first and second end sections.

8. The wear shoe system of claim 7 wherein each said first and second retaining means contact corresponding first and second contacting surfaces of said wear shoe body.

9. The wear shoe system of claim 8 wherein each said first retaining means is a removable plate.

10. The wear shoe system of claim 8 wherein each said second retaining means is a contacting member extending over said portion of said slide bar covered by said wear shoe body.

11. The wear shoe system of claim 8 wherein said first and said second contacting surfaces are first and second beveled edges and said first and said second retaining means have corresponding mating beveled edges.

12. The wear shoe system of claim 7 wherein said replaceable C-section wear shoe bodies are interchangeable.

* * * * *